United States Patent
Tada et al.

(10) Patent No.: US 10,983,013 B2
(45) Date of Patent: Apr. 20, 2021

(54) TEMPERATURE SENSING BODY

(71) Applicant: HITACHI, LTD., Tokyo (JP)

(72) Inventors: Yasuhiko Tada, Tokyo (JP); Masahiro Kawasaki, Tokyo (JP); Kohhei Aida, Tokyo (JP); Hiroshi Sasaki, Tokyo (JP); Toyotaka Yuasa, Tokyo (JP); Hiroyuki Kagawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 199 days.

(21) Appl. No.: 15/769,593

(22) PCT Filed: Oct. 21, 2015

(86) PCT No.: PCT/JP2015/079655
§ 371 (c)(1),
(2) Date: Apr. 19, 2018

(87) PCT Pub. No.: WO2017/068657
PCT Pub. Date: Apr. 27, 2017

(65) Prior Publication Data
US 2018/0306649 A1    Oct. 25, 2018

(51) Int. Cl.
*G01K 11/12* (2021.01)
*G01K 11/16* (2021.01)
(Continued)

(52) U.S. Cl.
CPC ............... *G01K 11/16* (2013.01); *C09K 3/00* (2013.01); *G01K 1/02* (2013.01); *G01K 3/04* (2013.01); *G01K 11/18* (2013.01); *H01B 1/22* (2013.01)

(58) Field of Classification Search
CPC .......... G01K 11/12; G01K 1/16; G01K 13/00; G01K 11/00
(Continued)

(56) References Cited

U.S. PATENT DOCUMENTS 4,028,118 A * 6/1977 Nakasuji .............. C08K 5/0041
106/31.19
4,732,810 A * 3/1988 Kito ....................... G01K 11/16
106/31.17
(Continued)

FOREIGN PATENT DOCUMENTS

JP          54028276 A   *   3/1979
JP          H2-19155 A       10/1987
(Continued)

OTHER PUBLICATIONS

Chinese Office Action dated Jul. 19, 2019 for the Chinese Patent Application No. 201580083999.3.
(Continued)

*Primary Examiner* — Gail Kaplan Verbitsky
(74) *Attorney, Agent, or Firm* — Volpe Koenig

(57) ABSTRACT

The present invention addresses the problem of providing a temperature sensing body capable of sensing both a temperature increase and a temperature decrease, and having an anti-tampering function. In order to solve said problem, this temperature sensing body is characterized by including: a first ink in which a temperature $T_{a1}$ for initiating color disappearance when the temperature rises and a temperature $T_{d1}$ for initiating color development when the temperature falls are different; and a second ink in which a temperature $T_{a2}$ for initiating color disappearance when the temperature rises and a temperature $T_{d2}$ for initiating color development when the temperature falls are different, wherein the temperature $T_{a1}$ for initiating color disappearance, the temperature $T_{d1}$ for initiating color development, the temperature $T_{a2}$ for initiating color disappearance, and the temperature $T_{d2}$ for initiating color development have the relationship, $T_{d1} < T_{d2} < T_{a1} < T_{a2}$.

17 Claims, 8 Drawing Sheets

(51) Int. Cl.
*C09K 3/00* (2006.01)
*G01K 11/18* (2006.01)
*G01K 3/04* (2006.01)
*G01K 1/02* (2021.01)
*H01B 1/22* (2006.01)

(58) Field of Classification Search
USPC .............................. 116/216, 162, 106, 161
See application file for complete search history.

(56) References Cited

U.S. PATENT DOCUMENTS

| | | | | |
|---|---|---|---|---|
| 5,158,364 | A * | 10/1992 | Labes | G01K 11/165 |
| | | | | 116/218 |
| 5,375,271 | A * | 12/1994 | Frankel | A47K 3/002 |
| | | | | 374/162 |
| 5,484,205 | A * | 1/1996 | Grubb | G01K 1/02 |
| | | | | 368/11 |
| 6,178,151 | B1 * | 1/2001 | Hino | G11B 7/1381 |
| | | | | 369/118 |
| 6,494,950 | B1 | 12/2002 | Fujita et al. | |
| 6,579,006 | B1 * | 6/2003 | Pariseau | G01K 1/16 |
| | | | | 116/216 |
| 6,660,452 | B2 * | 12/2003 | Iwasaki | G11B 23/40 |
| | | | | 430/19 |
| 6,761,066 | B2 * | 7/2004 | Rait | G01F 23/22 |
| | | | | 73/290 R |
| 6,816,149 | B1 * | 11/2004 | Alsleben | G06F 3/03543 |
| | | | | 116/216 |
| 7,528,737 | B2 * | 5/2009 | Hedtke | G01K 11/165 |
| | | | | 340/870.01 |
| 7,691,458 | B2 * | 4/2010 | Brist | G01D 7/005 |
| | | | | 340/531 |
| 7,712,431 | B2 * | 5/2010 | Roche | F16B 43/00 |
| | | | | 116/207 |
| 7,712,432 | B2 * | 5/2010 | Chikahisa | H05K 3/1216 |
| | | | | 101/127.1 |
| 7,906,054 | B2 * | 3/2011 | Hirschfelder | B29C 45/1418 |
| | | | | 264/251 |
| 8,980,381 | B2 * | 3/2015 | Graham | B05D 3/0254 |
| | | | | 427/558 |
| 9,944,811 | B2 * | 4/2018 | Owen | C09D 5/26 |
| 2002/0097778 | A1 * | 7/2002 | Moroskat | G01K 1/14 |
| | | | | 374/162 |
| 2007/0156106 | A1 * | 7/2007 | Klofta | A61F 13/42 |
| | | | | 604/361 |
| 2007/0167325 | A1 * | 7/2007 | Leroux | B41M 5/28 |
| | | | | 503/201 |
| 2007/0175382 | A1 * | 8/2007 | Warner | G01K 1/14 |
| | | | | 116/216 |
| 2008/0086105 | A1 * | 4/2008 | Sour | A61F 5/03 |
| | | | | 604/385.23 |
| 2008/0279253 | A1 * | 11/2008 | MacDonald | A41D 13/002 |
| | | | | 374/162 |
| 2009/0320742 | A1 * | 12/2009 | Leute | G01K 3/005 |
| | | | | 116/207 |
| 2012/0251222 | A1 * | 10/2012 | Toomi | B43K 7/00 |
| | | | | 401/209 |
| 2013/0075675 | A1 * | 3/2013 | Krutak | C09B 9/00 |
| | | | | 252/583 |
| 2013/0255536 | A1 * | 10/2013 | Mehta | B42D 25/29 |
| | | | | 106/31.14 |
| 2015/0047552 | A1 | 2/2015 | Ortais | |
| 2016/0296692 | A1 * | 10/2016 | Agris | A61M 5/007 |
| 2016/0333210 | A1 * | 11/2016 | Wang | C08K 5/09 |
| 2019/0383649 | A1 * | 12/2019 | Abdo | B32B 7/12 |

FOREIGN PATENT DOCUMENTS

| | | | |
|---|---|---|---|
| JP | 2004-137614 A | | 5/2004 |
| JP | 2005-172544 A | | 6/2005 |
| JP | 2006-047176 A | | 2/2006 |
| JP | 2007-169215 A | | 7/2007 |
| JP | 2008-239810 A | | 10/2008 |
| JP | 2011003510 A | * | 1/2011 |
| JP | 2012-088095 A | | 5/2012 |
| JP | 2012-189540 A | | 10/2012 |
| WO | WO2005077665 A | * | 8/2005 |

OTHER PUBLICATIONS

Extended European Search Report dated May 22, 2019 for the European Patent Application No. 15906663.8.
International Search Report for WO 20171068657 A1, dated Nov. 24, 2015.

* cited by examiner

TEMPERATURE SENSING BODY

TECHNICAL FIELD

The present invention relates to a temperature detector for confirming temperatures, a history of temperature increase and temperature decrease of an object for which temperatures are to be detected, and the like.

BACKGROUND ART

Fresh foods, frozen foods, and medicinal products stored at low temperatures such as vaccines and biomedicinal products need a cold chain for keeping at a low temperature without interruption during the process of production, transportation and consumption. Actually, in order to continually measure and record the temperatures during distribution, generally, a data logger capable of continuously recording times and temperatures is installed in a transport container in many cases. Therefore, in a case where a product is damaged, the locus of responsibility can be clarified. Furthermore, in a case where the quality of an individual product is to be ensured, a method utilizing a temperature indicator is exemplified. A temperature indicator does not have a recording accuracy as high as that of a data logger, but can be attached to an individual product, and the surface is dyed in a case where the temperature is greater than or lower than a temperature that has been set in advance. Therefore, it is possible to know a change in temperature environment.

However, a managed temperature range for vaccines and biomedicinal products is 2 to 8° C., and detection of both temperature increase (8° C. or more) and temperature decrease (2° C. or less) is required. In a case where temperature management is required in a certain temperature range, a data logger is the most useful. On the other hand, in order to manage an individual product as mentioned above, a data logger is not useful for individual management due to its price and size.

Furthermore, as a temperature indicator capable of detecting both temperature increase and temperature decrease, PTL 1 discloses a temperature-indicating agent utilizing a leuco dye.

CITATION LIST

Patent Literature

PTL 1: JP 2-19155 B

SUMMARY OF INVENTION

Technical Problem

The temperature-indicating agent disclosed in PTL 1 can be tampered since the color is reversibly changed, and thus it is difficult to ensure temperature management during distribution.

A temperature detector capable of detecting deviation from a managed temperature is required to be capable of being installed in an individual product for which management within a predetermined temperature range is necessary, to be capable of detecting both temperature increase and temperature decrease and to have an anti-tampering function such that the temperature detector does not return to the original state even after deviation from a managed temperature range.

Therefore, the object of the present invention is to provide a temperature detector that can detect both temperature increase and temperature decrease and has an anti-tampering function.

Solution to Problem

A temperature detector of the present invention includes: a first ink in which a decoloring initiating temperature $T_{a1}$ during temperature increase and a color developing initiating temperature $T_{d1}$ during temperature decrease are different, and a second ink in which a decoloring initiating temperature $T_{a2}$ during temperature increase and a color developing initiating temperature $T_{d2}$ during temperature decrease are different, wherein the decoloring initiating temperature $T_{a1}$, the color developing initiating temperature $T_{d1}$, the decoloring initiating temperature $T_{a2}$ and the color developing initiating temperature $T_{d2}$ have the relationship of $T_{d1} < T_{d2} < T_{a1} < T_{a2}$.

Advantageous Effects of Invention

According to the present invention, a temperature detector that can detect both temperature increase and temperature decrease and has anti-tampering function can be provided.

DESCRIPTION OF EMBODIMENTS

Figure 1:
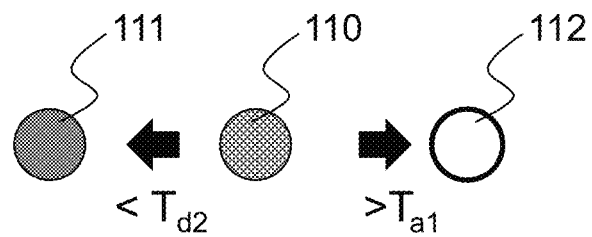
FIG. 1 is a plane view illustrating the temperature detector of an embodiment of the present invention.

The present invention is a temperature detector that detects temperature increase and temperature decrease by an irreversible color change. Exemplary embodiments of the temperature detector capable of preventing tampering of the present invention will be explained in detail with suitably referring to the drawings.

(Basic Constitution of Temperature Detector)

The temperature detector of the present invention is constituted by, at least, a first ink in which a temperature $T_{a1}$ for initiating decoloring when the temperature increases and a temperature $T_{d1}$ for initiating color developing when the temperature decreases are different, and a second ink in which a $T_{a2}$ for initiating decoloring when the temperature increases and a $T_{d2}$ for initiating color developing when the temperature decreases are different, and the decoloring initiating temperatures and the color developing initiating temperatures have the relationship of $T_{d1} < T_{d2} < T_{a1} < T_{a2}$. Furthermore, when the temperature of the temperature detector at the initial state is set as T, the initial temperature T, the decoloring temperature $T_{a1}$ of the first ink and the color developing initiating temperature $T_{d2}$ of the second ink satisfy the relationship of $T_{d2} < T < T_{a1}$. The temperature T is the initial temperature of an object for which temperature detection is intended.

FIGS. 1 to 5 each illustrates a plane view of the temperature detector of an embodiment of the present invention. The temperature detector 110 of FIG. 1 is constituted by printing a first ink and a second ink on the same portion on a substrate or the like. In the initial state, i.e., at the temperature from the color developing initiating temperature $T_{d2}$ of the second ink to the decoloring initiation temperature $T_{a1}$ of the first ink, the color of the first ink that has caused coloring is indicated. In the temperature detector 110, when the temperature is $T_{d2}$ or less, a color 111 that is derived from the color of the first ink that has caused coloring and the color of the second ink that has caused coloring is indicated. Furthermore, when the temperature is $T_{a1}$ or more in the temperature detector, the color 111 changes to a color 112 that is derived from the color of the first ink that has caused decoloring and the color of the second ink that has caused decoloring.

Figure 2:
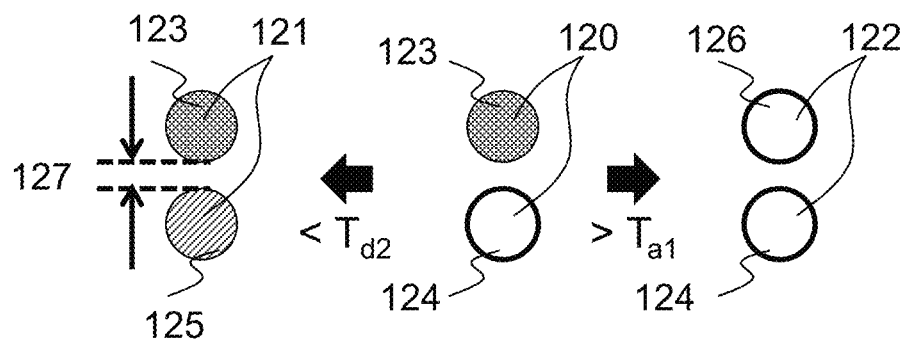
FIG. 2 is a plane view illustrating the temperature detector of an embodiment of the present invention.

Although the temperature detector 110 in FIG. 1 is such that the first ink and the second ink are printed on the same portion, the printed first ink and second ink may be disposed at a distance 127 between the ends of printed bodies as shown in FIG. 2. FIG. 2 shows a temperature detector 120 in which a first ink 123 and a second ink 124 are disposed at the distance 127. In the temperature detector 120, the first ink 123 causes coloring, and the second ink 124 is in a decoloring state at a temperature of $T_{d2}$ to $T_{a1}$. In the temperature detector 120, the second ink 124 changes to a colored state 125 by temperature decrease to $T_{d2}$ or less, whereby the temperature detector 120 changes to a temperature detector 121 in which both the first ink and the second ink cause coloring. On the other hand, in the temperature detector 120, the color of the first ink 123 changes to a decoloring state 126 by temperature increase to $T_{a1}$ or more, whereby the temperature detector 120 changes to a temperature detector 122 in which both the first ink and second ink cause decoloring.

Figure 3:
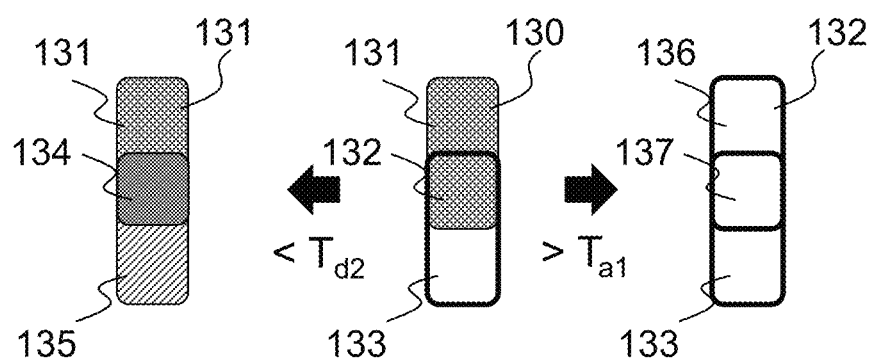
FIG. 3 is a plane view illustrating the temperature detector of an embodiment of the present invention.

Furthermore, the first ink and the second ink may be partially overlapped. FIG. 3 indicates a temperature detector 130 in which a first ink and a second ink are printed with partial overlapping. The temperature detector 130 is formed by printing the second ink so as to overlap with a part of the first ink printed on the substrate, or printing the first ink so as to overlap with a part of the second ink printed on the substrate. The first ink temperature detector 130 has a region 132 where the first ink 131 and second ink 133 are overlapped, the region 132 indicates the color of the first ink at a temperature from $T_{d2}$ to $T_{a1}$, and the single first ink 131 is in a colored state and the single second ink 133 is in a decoloring state. In the temperature detector 130, the color of the second ink 133 changes to a colored state 134, and the color of the region 133 changes to a state 133 that reflects the colors of the first ink and the second ink by temperature decrease to $T_{d2}$ or less. On the other hand, in the temperature detector 130, the color of the first ink 131 changes to a decoloring state 135, and both the first ink and the second ink are put into a decoloring state 136 in the region 132 by temperature increase to $T_{a1}$ or more.

Figure 4:
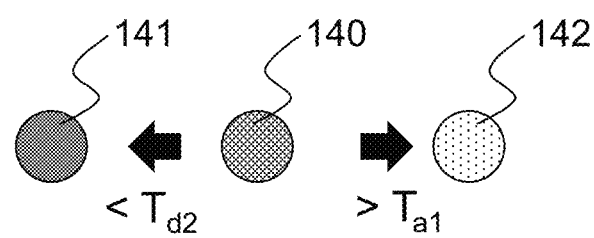
FIG. 4 is a plane view illustrating the temperature detector of an embodiment of the present invention.

Furthermore, a third ink in which the color is not changed depending on temperatures can also be used. FIG. 4 illustrates a temperature detector 140 in which a first ink and a second ink are printed on a third ink that indicates a color that does not change against temperatures. The temperature detector 140 illustrates a state in which the colors of the first ink, the second ink and the third ink are reflected. Furthermore, the third ink may be separately disposed as illustrated in FIG. 2, or may be disposed so that a part overlaps as illustrated in FIG. 3. The temperature detector 140 in FIG. 4 is constituted by printing, on the same portion, a first ink having a temperature $T_{a1}$ for initiating decoloring when the temperature increases and a temperature $T_{d1}$ for initiating color developing when the temperature decreases, a second ink having a temperature $T_{a2}$ for initiating decoloring when the temperature increases and a temperature $T_{d2}$ for initiating color developing when the temperature decreases, and a third ink that shows a certain predetermined color at any temperature range. At a temperature of $T_{d2}$ to $T_{a1}$, the temperature detector 140 is in the state in which the color of the first ink that has caused coloring and the color of the third ink are reflected. Depending on temperature decrease to $T_{d2}$ or less and temperature increase to $T_{a1}$ or more, the temperature detector 140 changes to a temperature detector 141 that shows a color derived from the first ink, second ink and third ink that have respectively caused coloring, or to a temperature detector 142 that shows a color derived from the first ink, second ink and third ink that have respectively caused decoloring.

Figure 5:
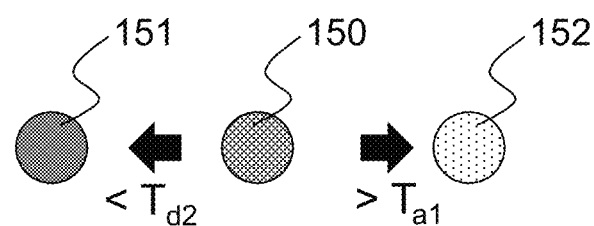
FIG. 5 is a plane view illustrating the temperature detector of an embodiment of the present invention.

The temperature of the above-mentioned third ink may change as in the first ink and the second ink. FIG. 5 shows a temperature detector 150 using a third ink in which the color changes due to temperature change. Furthermore, the third ink may be separately disposed as illustrated in FIG. 2, or may be disposed so that a part overlaps as illustrated in FIG. 3. The temperature detector 150 of FIG. 5 is constituted by printing, on the same portion, a first ink having a temperature $T_{a1}$ for initiating decoloring when the temperature increases and a temperature $T_{d1}$ for initiating color developing when the temperature decreases, a second ink having a temperature $T_{a2}$ for initiating decoloring when the temperature increases and a temperature $T_{d2}$ for initiating color developing when the temperature decreases, and a third ink having a temperature $T_{a3}$ for initiating decoloring when the temperature increases and a temperature $T_{d3}$ for initiating color developing when the temperature decreases, and the decoloring and color developing initiating temperatures are in the relationship of $T_{d1} < T_{d2} < T_{d3} < T_{a1} < T_{a2} < T_{a3}$. In a case where a state that the first ink and the third ink have caused coloring and the second ink is in a decoloring state is set as an initial state of the temperature detector 150, the temperature detector 150 is in a state in which the colors of the first ink and the third ink that have caused coloring are reflected at a temperature of $T_{d2}$ to $T_{a1}$. The temperature detector 150 changes to a temperature detector 151 in which a color derived from the first ink, second ink and third ink that have respectively caused coloring, and further changes to a temperature detector 152 in which a color derived from the first ink and second ink that have respectively caused decoloring, and the third ink that has caused coloring by temperature decrease to $T_{d2}$ or less or temperature raising to $T_{a1}$ or more.

(Anti-Tampering Function)

Figure 6A:
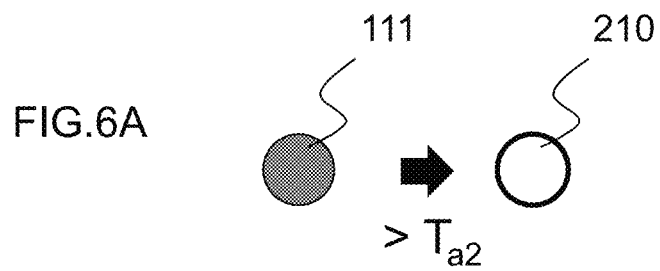
FIGS. 6A to 6B are a drawing explaining the anti-tampering function of the temperature detector in FIG. 1.
Figure 6B:
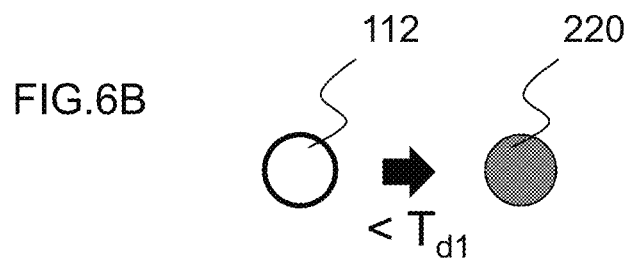

The anti-tampering function of the temperature detector in FIG. 1 will be explained by using FIGS. 6A to 6B. In order to return the state 111 that the color of the temperature detector 110 has changed due to the decrease of the temperature to $T_{d2}$ or less to the original temperature detector 110, it is necessary to allow the second ink to cause decoloring. Since the decoloring initiating temperatures of the first ink and the second ink have the relationship of $T_{a2} > T_{a1}$, it is difficult to allow only the second ink to cause decoloring. If the temperature is changed to $T_{a2}$ or more, as shown in FIG. 6A, both the first ink and second ink are put into a decoloring state 210, and thus the temperature detector cannot be returned to the initial state 110 of the original temperature detector. Furthermore, in order to return the state 112 that the color of the temperature detector has changed due to the increase of the temperature to $T_{a1}$ or more to the original temperature detector 110, it is necessary to allow the first ink to cause coloring. Since the color developing initiating temperatures of the first ink and the second ink have the relationship of $T_{d1} < T_{d2}$, it is difficult to allow only the first ink to cause coloring. If the temperature is changed to $T_{d2}$ or less, as shown in FIG. 6B, both the first ink and second ink are put into a colored state 220, and thus the temperature detector cannot be returned to the state of the original temperature detector 110. Accordingly, if the constitution of the present invention is used, a temperature detector that can prevent color change can be provided.

Figure 7A:
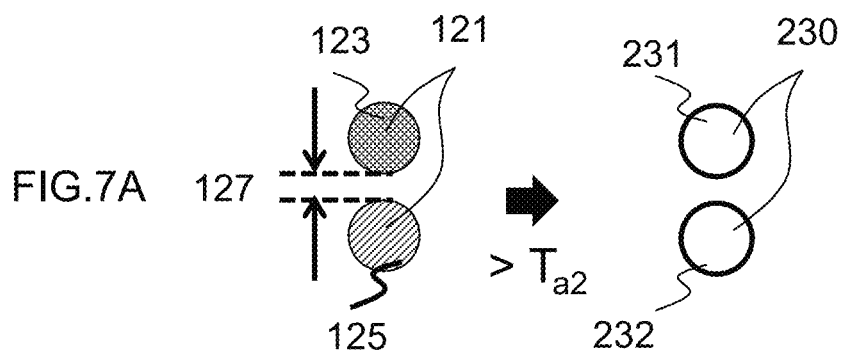
FIGS. 7A to 7B are a drawing explaining the anti-tampering function of the temperature detector in FIG. 2.
Figure 7B:
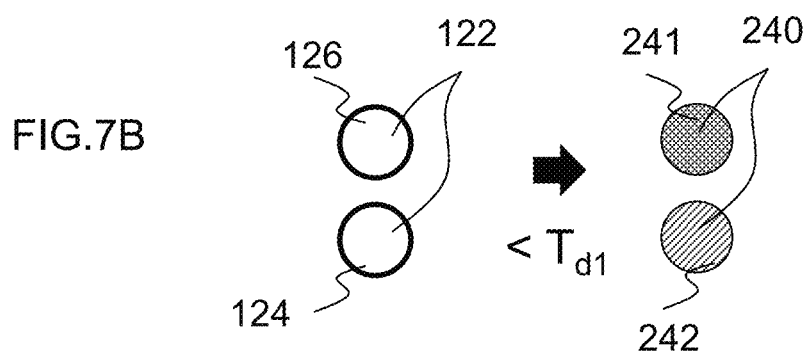

The temperature detector in FIG. 2 can be similarly explained. In order to return the state 121 that the color has changed due to the decrease of the temperature to $T_{d2}$ or less to the initial state 120, it is necessary to cause decoloring in the second ink. In a case where the temperature is changed to $T_{a2}$ or more so as to cause decoloring in the second ink, as shown in FIG. 7A, both the first ink and second ink are put into a decoloring state 230. Furthermore, in order to return the state 122 that the color of the temperature detector has changed due to the increase of the temperature to $T_{a1}$ or more to the initial state 120, it is necessary to allow the first ink to cause coloring. If the temperature is changed to $T_{d2}$ or less so as to cause coloring in the first ink, as shown in FIG. 7B, both the first ink and second ink are put into a colored state 240 and thus cannot be returned to the initial state 120. Furthermore, in order to prevent tampering, it is preferable that the printing distance 127 between the first ink and the second ink is smaller than the size of a printed body, and it is preferable that the first ink and the second ink are disposed at a distance within 1 to 10% with respect to the size of either print.

Figure 8A:
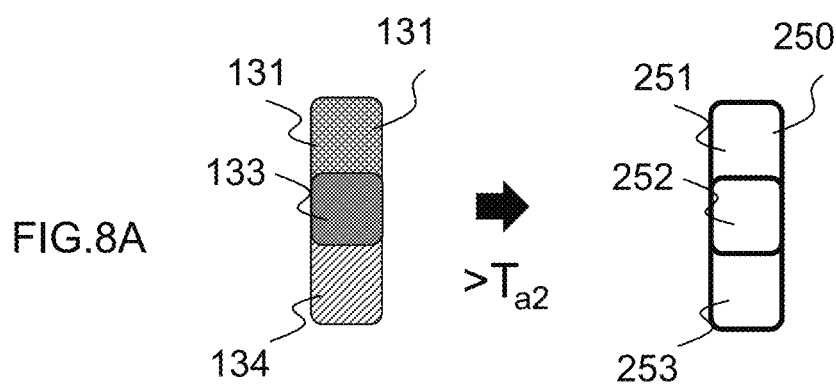
FIGS. 8A to 8B are a drawing explaining the anti-tampering function of the temperature detector in FIG. 3.
Figure 8B:
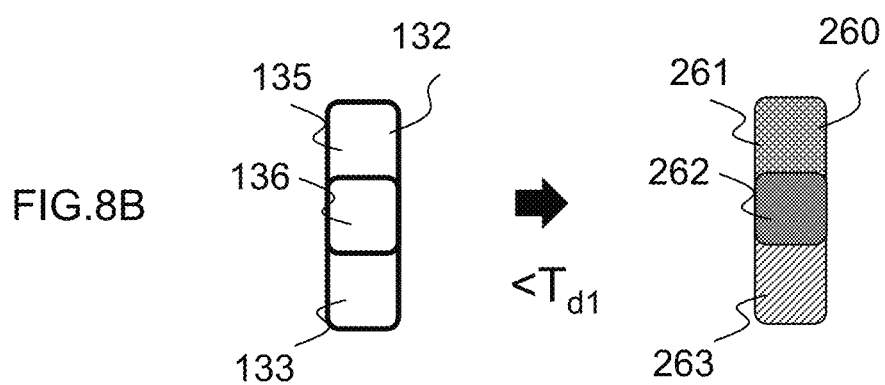
Figure 9A:
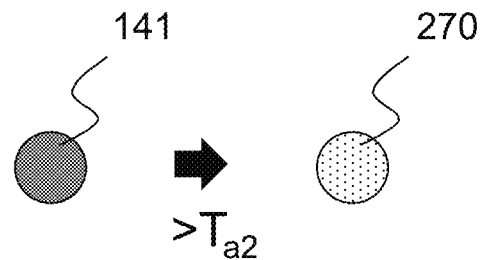
FIGS. 9A to 9B are a drawing explaining the anti-tampering function of the temperature detector in FIG. 4.
Figure 9B:
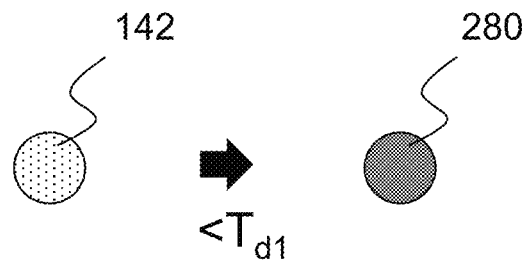
Figure 10A:
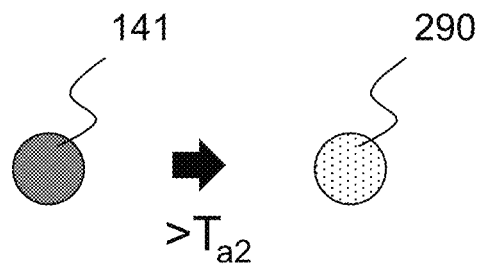
FIGS. 10A to 10B are a drawing explaining the anti-tampering function of the temperature detector in FIG. 5.
Figure 10B:
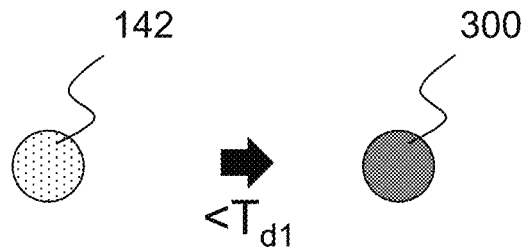

Furthermore, the temperature detectors in FIGS. 3 to 5 can be similarly explained. FIGS. 8A to 8B show a drawing explaining the anti-tampering function of the temperature detector in FIG. 3, FIGS. 9A to 9B show a drawing explaining the anti-tampering function of the temperature detector in FIG. 4, and FIGS. 10A to 10B show a drawing explaining the anti-tampering function of the temperature detector in FIG. 5. None of the temperature detectors can allow only the second ink to cause decoloring so as to return the temperature detector to the initial state in a case where the temperature has decreased to $T_{d2}$ or less. Furthermore, none of the temperature detectors can allow only the first ink to cause coloring so as to return the temperature detector to the initial state in a case where the temperature has raised to $T_{a1}$ or more.

When the first ink and second ink having the relationship of $T_{d1} < T_{d2} < T_{a1} < T_{a2}$ are used as mentioned above, it becomes possible to prevent tampering by setting the state that coloring has occurred in the first ink and decoloring has occurred in the second ink as an initial state.

(Constitution of Ink)

As the first ink and the second ink in the present invention, inks in which a decoloring initiating temperature and a color developing initiating temperature are different can be used.

Figure 11A:
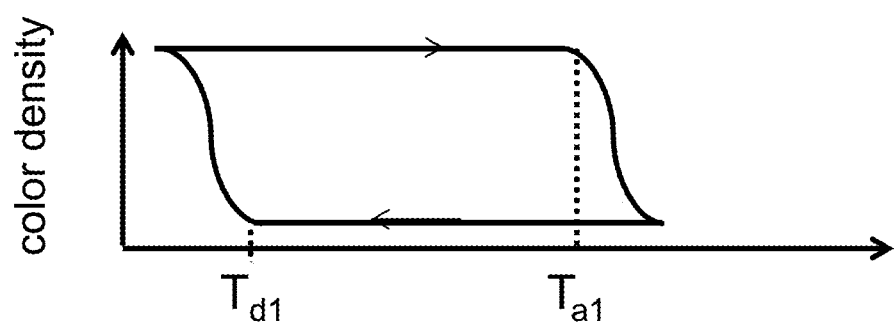
FIGS. 11A to 11B show schematic drawings illustrating the color density changes of the first ink and second ink against the temperature.
Figure 11B:
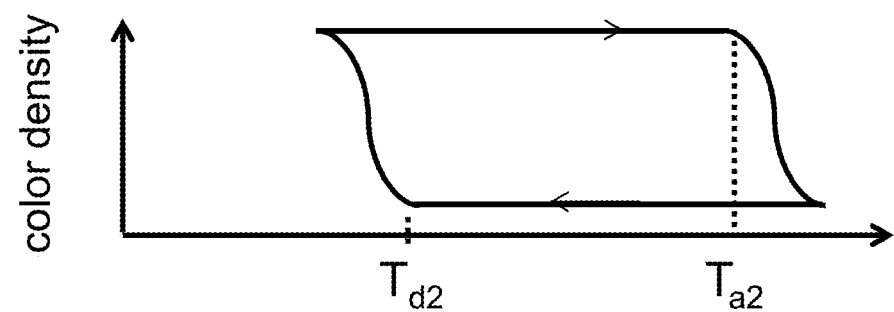

The reversible color changes associated with the temperature changes of the first and second inks of the present invention can be respectively illustrated by FIGS. 11A to 11B. In FIGS. 11A to 11B, the temperature is indicated in the horizontal axis, and the color density is indicated in the longitudinal axis. For example, in the first ink shown in FIG. 11A, when the temperature reaches $T_{a1}$ during temperature increase, the color density decreases, and the first ink changes to the state that the color density is the lowest (a decoloring state). Furthermore, when the ink in the decoloring state is cooled, the decoloring state is maintained up to $T_{d1}$, and when the temperature reaches $T_{d1}$, the color density increases, and the state changes to a coloring state. In the first ink in the coloring state, the coloring state is maintained if there is no temperature increase that exceeds $T_{a1}$. The same applies to the second ink, and the coloring and decoloring states respectively change at the temperatures of $T_{d2}$ and $T_{a1}$. Such cycle of reversible color change is generally known as a hysteresis color change phenomenon.

The first ink and second ink that constitute the temperature detector of the present invention utilize the respective hysteresis color change phenomena, and the temperatures at which the inks change to coloring or decoloring have the relationship of $T_{d1} < T_{d2} < T_{a1} < T_{a1}$. Furthermore, in a case of use as a temperature detector, it is desirable that one of the first ink or the second ink is in a coloring state and the other is in a decoloring state in a temperature detection range.

As a material showing such hysteresis color change phenomenon, a composition consisting of a leuco dye, which is an electron-donating compound, a developer, which is an electron-accepting compound, and a decoloring agent for controlling a temperature range of hysteresis is desirable. The leuco dye is generally colorless or indicates a pale color, and causes coloring by contacting with the developer. The decoloring agent can cause decoloring in the colored leuco dye upon heating in the co-presence of the leuco dye and the developer. The temperature range of hysteresis significantly depends on the melting point and solidification point of the decoloring agent.

Furthermore, it is necessary to adjust the hysteresis width of the used ink by managing the temperature. For example, in a case where management is intended at a temperature range of 2° C. to 8° C. as in medicinal products, it is necessary that $T_{a1} - T_{d1}$ representing the hysteresis width of the first ink satisfies $T_{a1} - T_{d1} \geq 6°$ C., and that $T_{a2} - T_{d2}$ representing the hysteresis width of the second ink satisfies $T_{a2} - T_{d2} \geq 6°$ C. Furthermore, in a case where management is intended at a temperature range of 5° C. to 15° C. in fresh foods and the like, it is necessary to satisfy $T_{a1} - T_{d1} \geq 10°$ C. and $T_{a2} - T_{d2} \geq 10°$ C.

Furthermore, in a case where temperature management is intended in foods and medicinal products, the temperature width for which management is intended is about 5° C. to 15° C. in many cases. Therefore, it is preferable that the color developing temperature $T_{d2}$ of the second ink and the decoloring temperature $T_{a1}$ of the first ink satisfy the relationship of $5 \leq T_{a1} - T_{d2} \leq 15°$ C.

(Leuco Dye)

As the leuco dye, a leuco dye that is consisted of an electron-donating compound and has been conventionally known as a dye for pressure sensitive copying paper or a dye for thermosensitive recording paper can be utilized. Examples include triphenylmethanephthalide-based, fluorane-based, phenothiazine-based, indolylphthalide-based, leucoauramine-based, spiropyran-based, rhodamine lactam-based, triphenylmethane-based, triazene-based, spirophthalan xanthene-based, naphtholactam-based and azomethine-based leuco dyes. Specific examples of such leuco dye include 9-(N-ethyl-N-isopentylamino)spiro[benzo[a]xanthene-12,3'-phthalide], 2-methyl-6-(N-p-tolyl-N-ethylamino)-fluorane 6-(diethylamino)-2-[(3-trifluoromethyl)anilino]xanthene-9-spiro-3'-phthalide, 3,3-bis(p-diethylaminophenyl)-6-dimethylaminophthalide, 2'-anilino-6'-(dibutylamino)-3'-methylspiro[phthalide-3,9'-xanthene], 3-(4-diethylamino-2-methylphenyl)-3-(1-ethyl-2-methylindol-3-yl)-4-azaphthalide and 1-ethyl-8-[N-ethyl-N-(4-methylphenyl)amino]-2,2,4-trimethyl-1,2-dihydrospiro[11H-chromeno[2,3-g]quinoline-11,3'-phthalide. For the temperature detector in which the first ink and the second ink are printed with overlapping as in FIGS. 1 and 3 to 5, from the viewpoint of visibility, it is specifically preferably to use a dye that causes coloring in a color other than black, and it is further preferable that the first ink and the second ink indicate different colors. Specifically, 9-(N-ethyl-N-isopentylamino)spiro[benzo[a]xanthene-12,3'-phthalide] is preferable as the leuco dye of the first ink, and 3-(4-diethylamino-2-methylphenyl)-3-(1-ethyl-2-methylindol-3-yl)-4-azaphthalide is preferable as the leuco dye of the second ink. The combination of the first ink and the second ink is not limited to these, and any combination may be used as long as it indicates different colors.

Furthermore, in the present invention, one kind or a combination of two or more kinds can be used for the first ink, the second ink or the third ink.

(Developer)

The developer of an electron receptor used in the ink in the present invention can change the structure of the leuco dye to cause coloring by contacting with an electron-donating leuco dye. As the developer, known developers used in thermosensitive recording paper, pressure sensitive copying paper and the like can be utilized. Specific examples of such developer can include phenols such as benzyl 4-hydroxybenzoate, 2,2'-biphenol, 1,1-bis(3-cyclohexyl-4-hydroxyphenyl)cyclohexane, 2,2-bis(3-cyclohexyl-4-hydroxyphenyl)propane, bisphenol A, bisphenol F, bis(4-hydroxyphenyl)sulfide, paraoxybenzoic acid esters and gallic acid esters can be exemplified. The developer is not limited to these, and may be any compound as long as it is an electron acceptor and can change the color of the leuco dye. Alternatively, metal salts of carboxylic acid derivatives, salicylic acid and metal salts of salicylic acid, sulfonic acids, sulfonic acid salts, phosphoric acids, phosphoric acid metal salts, acidic phosphoric acid esters, acidic phosphoric acid ester metal salts, phosphinic acids, phosphinic acid metal salts and the like may be used. Specifically, developers having high compatibility with the leuco dye and the decoloring agent mentioned below are preferable, and organic-based developers such as 2,2'-bisphenol, bisphenol A and gallic acid esters are preferable.

In the ink in the present invention, one kind or a combination of two or more kinds of these developers may be used, and the color density during the coloring of the leuco dye can be adjusted by combining the developers. The use amount of the developer is selected depending on the desired color density. For example, the use amount may be generally used within the range of about 0.1 to 100 parts by weight with respect to 1 part by weight of the above-mentioned leuco pigment.

(Decoloring Agent)

The decoloring agent in the present invention is a compound that can solve the binding of the leuco dye and the developer, and is a compound that can control the coloring temperatures of the leuco dye and the developer. Generally, in the temperature range at which the leuco dye is in a coloring state, the decoloring agent is solidified in a phase-separated state. Furthermore, in the temperature range at which the leuco dye is in a decoloring state, the decoloring agent is melted and in the state that a function to solve the binding between the leuco dye and the developer is exerted. The coloring and decoloring temperatures of the leuco dye used in the ink in the present invention depends on the solidification point and the melting point of the decoloring agent. Therefore, it is desirable that there is a temperature difference between the solidification point and the melting point of the decoloring agent. Furthermore, the temperature of the melting point or the solidification point depends on the intended temperature management range. Specific examples include aliphatic acid ester compounds such as isopropyl myristate, isopropyl palmitate, tricaprylin, tricaprin, trilaurin and trimyristin, and it is preferable to include these compounds from the viewpoint of compatibility with the leuco dye and the developer. Furthermore, these decoloring agents may be used by one kind, or in combination of two or more kinds, and in this case, the solidification point and the melting point can be adjusted. The decoloring agent is not limited to these compounds as a matter of course, and examples can include other esters, alcohols, ethers, ketones, amides, azomethines, aliphatic acids, hydrocarbons and the like.

(Microencapsulation)

The combination of the leuco dye, the developer and the decoloring agent used in the ink of the present invention can be used by homogeneously dispersing in an ink, a coating, a synthetic resin or the like as in a general dye or pigment. However, from the viewpoint of storage stability, it is desirable that the leuco dye, the developer and the decoloring agent are independently enclosed in microcapsules formed of a resin coating. Specifically, in a case where the first ink and second ink are printed on the same portion as shown in FIG. 1, it is desirable to conduct microencapsulation so that the leuco dye, the color developer and the decoloring agent in the first ink and second ink are not mixed. By microencapsulation, the environment resistance of the composition against humidity and the like are improved as mentioned above, and thus the stabilization of the storage stability, color change property and the like become possible. Furthermore, by the microencapsulation, it is possible to suppress the effects on the leuco dye, the developer and the decoloring agent from other compounds such as resin agents and additives, when prepared into an ink, a coating or the like.

For the microencapsulation, known various means can be applied. Examples include, but are not limited to, an emulsification polymerization process, a suspension polymerization process, a coacervation process, an interface polymerization process, a spray drying process and the like. Furthermore, two or more kinds of different methods may be combined.

Examples of the resin coating used for the microcapsule include, but are not limited to, a urea resin coating formed of a polyvalent amine and a carbonyl compound, melamine resin coatings formed of a melamine-formol prepolymer, a methylolmelamine prepolymer and a methylated melamine prepolymer, urethane resin coatings formed of a polyvalent isocyanate and a polyol compound, amide resin coatings formed of a polyhydrochloride and a polyvalent amine, vinyl-based resin coatings formed of various monomers such as vinyl acetate, styrene, (meth)acrylic acid esters, acrylonitrile and vinyl chloride. Furthermore, additional treatments such as improvement of the dispersion stability of the microcapsule can be conducted by conducting a surface treatment on the formed resin coating to adjust the surface energies of the ink and during the coating.

Furthermore, in cases of use as an ink or a coating, the diameter of the microcapsule is preferably in the range of about 0.1 to 100 μm, further preferably in the range of 0.1 to 1 μm, depending on the method for the preparation of the temperature detector, since conformity to an apparatus, storage stability and the like are problems.

(Ink Solution)

In a case where a charge-control type inkjet printer is used so as to form the temperature detector of the present invention, a first ink solution and a second ink solution in which a first ink and a second ink are dispersed in solvents are necessary. The ink solutions each contains a resin, a colorant, an additive having a polydimethylsiloxane chain, an additive having an alkoxysilane group, a solvent and the like, and each ink is formed by stirring these materials by an overhead stirrer or the like to thereby allow the materials to be compatible or dispersible with one another. In a case where the ink has a high resistance, the conductive agent mentioned below is also added.

(Conductive Agent)

In a case where a charge-control type inkjet printer is used so as to form the temperature detector of the present invention, a first ink container and a second ink solution in which a first ink and a second ink are dispersed in solvents are necessary. The ink solutions have a tendency that ink particles do not fly straight but curve at an ink discharge unit in the charge-control type inkjet printer in a case where the resistance is high. Therefore, it is necessary that the resistance is set to approximately 2,000 Ωcm or less. The composition of the ink is mainly an organic solvent containing 2-butanone and ethanol as major ingredients, a resin and a pigment. Since these have low electroconductivity, if an ink is constituted by only these, the ink has a high resistance of about 5,000 to several ten thousands Ωcm, and thus desired printing is difficult in a charge-control type inkjet printer. Therefore, it is necessary to add a conductive agent. As the conductive agent, a complex is preferably used. It is necessary that the conductive agent is dissolved in the solvent used, and it is also important that the conductive agent does not affect color tones. Furthermore, a conductive agent having a salt structure is generally used. The reason is presumed that this conductive agent has unevenness of electrical charge in the molecule, and thus high electroconductivity can be exerted. It is inappropriate to add a substance that does not have a salt structure to the ink in the present invention since the resistance does not reach 2,000 Ωcm or less unless such substance is added at a considerably large rate.

As a result of the consideration from the above-mentioned viewpoint, it was found that a conductive agent having a salt structure is preferable as the conductive agent and a tetraalkyl ammonium ion structure is preferable as the positive ion. The alkyl chain may be either a straight or branched alkyl chain, and the solubility in solvents is improved more as the carbon number increases. However, the resistance can be decreased at a smaller addition rate at a smaller carbon number. A realistic carbon number for using in inks is about 2 to 8.

As the anion, a hexafluorophosphate ion, a tetrafluoroborate ion and the like are preferable since they have high solubility in solvents.

Although a perchlorate ion also has high solubility, it is explosive, and thus it is not realistic to use the perchlorate ion in the ink. Besides the perchlorate ion, chlorine, bromine, iodine ions are also exemplified, but these are not preferable since they tend to corrode metals such as iron and stainless when they contact the metals.

Accordingly, examples of preferable conductive agents include tetraethylammonium hexafluorophosphate, tetrapropylammonium hexafluorophosphate, tetrabutylammonium hexafluorophosphate, tetrapentylammonium hexafluorophosphate, tetrahexylammonium hexafluorophosphate, tetraoctylammonium hexafluorophosphate, tetraethylammonium tetrafluoroborate, tetrapropylammonium tetrafluoroborate, tetrabutylammonium tetrafluoroborate, tetrapentylammonium tetrafluoroborate, tetrahexylammonium tetrafluoroborate, tetraoctylammonium tetrafluoroborate, and the like.

(Method for Forming Temperature Detector)

As a means for a method for forming the temperature detector of the present invention, a charge-control type inkjet printer, an inkjet printer for large letters (a DOD-type industrial inkjet printer), screen printing, a dispenser and the like are exemplified, and a means using a charge-control type inkjet printer is desirable in handling mass products such as foods and medicinal products, and the time for printing on products and the price can be reduced. Furthermore, since printing is conducted by the charge-control type inkjet printer by allowing an ink to fly, printing is possible even if the printer is away from a target for printing by several ten millimeters, and thus printing corresponding to various packaging and shapes are possible. In a case where printing is conducted by using a charge-control type inkjet printer, the size of the printing is 0.1 mm or more and 1 mm or less. However, the means for forming the temperature detector is not limited to this inkjet printer as a matter of course. It is desirable that the temperature detector of the present invention is formed by the above-mentioned means, and is then stored within a managed temperature range.

Figure 12:
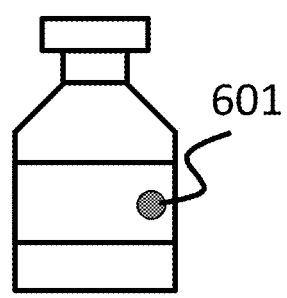
FIG. 12 is a drawing illustrating an example of a method for using a temperature detector.
Figure 13:
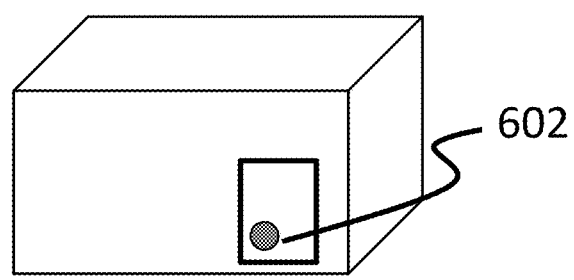
FIG. 13 is a drawing illustrating an example of a method for using a temperature detector.

Examples in which the temperature detector of the present invention is applied are shown in FIGS. 12 and 13. FIG. 12 is an example in which printing has been conducted on a curved surface of a bottle or the like, and a temperature detector 601 is disposed on a side surface of a bottle-shaped temperature managed product. Examples of such temperature managed product include foods, beverage products, medicinal products and the like. FIG. 13 is an example in which printing has been conducted on a plane surface of a packaged product or the like, and a temperature detector 602 is disposed on a box-like temperature managed product. Examples of such temperature managed product include foods, beverage products, medicinal products and the like.

(Method for Detecting Temperature Detector)

The temperature detector of the present invention can be confirmed by visual observation, and image data, or color gradation can also be scanned as data, but the detection is not limited to these. In a case of scanning as a data, various cameras can be used.

Secondly, the present invention will further be specifically explained with indicating Examples and Comparative Examples. However, the present invention is not limited by these Examples.

Example 1

In a first ink, 1 part by weight of RED500 manufactured by Yamada Chemical Co., Ltd. as a leuco dye, 1 part by weight of octyl gallate manufactured by Tokyo Chemical Industry Co., Ltd. as a developer, and 100 parts by weight of tricaprin as a decoloring agent were used. In a second ink, 1 part by weight of CVL manufactured by Yamada Chemical Co., Ltd. as a leuco dye, 1 part by weight of ethyl gallate manufactured by Tokyo Chemical Industry Co., Ltd. as a developer, and 100 parts by weight of trilaurin as a decoloring agent were used. An oil phase in which the leuco dye, developer and decoloring agent constituting each of the first ink and the second ink, 2,2'-azobis(isobutyronitrile) as a polymerization initiator, styrene and 2-ethylhexyl acrylate as a composition for a resin coating were dissolved was put into an aqueous phase to which a sorbitan aliphatic acid ester as a surfactant and a sodium salt had been added, and the mixture was stirred by a stirrer, whereby the first ink and the second ink were microencapsulated. The prepared respective microcapsules were prepared as an ink solution for an inkjet printer. To a container equipped with stirring blades were injected 2-butanone, a copolymerized product of a polyvinyl alcohol and a polyvinyl vinyl acetate having a number average molecular weight (Mn) of 10,000 (repeating number of polyvinyl alcohol unit:repeating number of polyvinyl acetate unit≈36:64, hydroxyl group value: 285) as a resin, and a microencapsulated first or second ink, and the mixture was mixed for about 1 hour, whereby each ink solution containing the first ink or the second ink was prepared. An inkjet printer manufactured by Hitachi Industrial Equipment Systems Co., Ltd. (Gravis RX-HD261J) was loaded with the prepared ink solutions, and the ink solutions were printed on a plastic film so as to form the temperature detector in FIG. 2 under an atmosphere at a temperature of 25 to 31° C., whereby a temperature detector was prepared. At that time, the ink solution containing the first ink had been cooled to 5° C. or less in advance and was used in a coloring state, and the ink solution containing the second ink had been heated to 50° C. or more in advance and used in a decoloring state.

Figure 14:
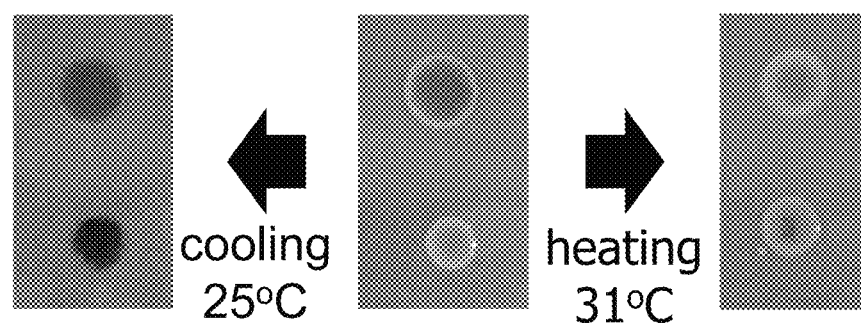
FIG. 14 is a photograph showing the color change of the temperature detector of Example 1.

FIG. 14 illustrates the temperature detector in Example 1. It was shown in the temperature detector prepared in this example that both the first ink and the second ink were put into a coloring state (first ink: red, second ink: blue) at 25° C. or less, whereas both the first ink and the second ink caused decoloring at 31° C. or more, and thus tampering was impossible. Accordingly, it was confirmed that the temperature detector prepared in this Example had an anti-tampering function and was able to detect temperature increase and temperature decrease.

Example 2

The first ink and the second ink were prepared and printed in similar manners to that in Example 1, and the temperature detector was printed so as to form the temperature detector illustrated in FIG. 1. It was shown in the temperature detector prepared in this example that both the first ink and the second ink were put into a coloring state at 25° C. or less, and thus the temperature detector indicated a color derived from the first ink and the second ink, whereas both the first ink and the second ink were put into a decoloring state at 31° C. or more, and thus the temperature detector changed to approximately colorless. Furthermore, it was shown that tampering was impossible. Accordingly, it was confirmed that the temperature detector prepared in this Example had an anti-tampering function and was able to detect temperature increase and temperature decrease.

Example 3

The first ink and the second ink were prepared and printing was conducted in similar manners to that in Example 1, and the temperature detector was printed so as to form the temperature detector illustrated in FIG. 3. In the temperature detector prepared in this example, the second ink caused coloring at 25° C. or less, the part where the first ink and the second ink were overlapped showed a color derived from the first ink and the second ink, the part of only the first ink did not change, and the part of only the second ink caused coloring. On the other hand, at 31° C. or more, the overlapped part changed to approximately colorless due to the decoloring of the first ink, the part of only the first ink changed to a decoloring state, and the part of only the second ink remained in a decoloring state. Furthermore, it was shown that tampering was impossible. Accordingly, it was confirmed that the temperature detector prepared in this Example had an anti-tampering function and was able to detect temperature increase and temperature decrease.

Example 4

The preparation of the first ink and the second ink was conducted in similar manners to that in Example 1, and Xylene Fast Yellow 2G, a dye that does not change color depending on temperatures, was added as a third ink. The printing was conducted in a similar manner to Example 1, and the temperature detector was printed so as to form the temperature detector illustrated in FIG. 4. In the temperature detector prepared in this example, the part where the first ink, the second ink and the third ink were overlapped indicated a color derived from all of the inks by the coloring of the second ink at 25° C. or less. On the other hand, at 31° C. or more, the color of the temperature detector changed to a color derived from the third ink by the decoloring states of both of the first ink and the second ink. Furthermore, it was shown that tampering was impossible. Accordingly, it was confirmed that the temperature detector prepared in this Example had an anti-tampering function and was able to detect temperature increase and temperature decrease.

Example 5

In the composition of a first ink, 1 part by weight of RED500 manufactured by Yamada Chemical Co., Ltd. as a leuco dye, 1 part by weight of ethyl gallate manufactured by Tokyo Chemical Industry Co., Ltd. as a developer, and 100 parts by weight of isopropyl myristin as a decoloring agent were used. On the other hand, in a second ink, 1 part by weight of CVL manufactured by Yamada Chemical Co., Ltd. as a leuco dye, 1 part by weight of ethyl gallate manufactured by Tokyo Chemical Industry Co., Ltd. as a developer, and 100 parts by weight of a mixture of tridecane and trilaurin as a decoloring agent were used. The preparation and printing of the first ink and the second ink were conducted in similar manners to that in Example 1 except for the compositions, and the temperature detector was printed so as to form the temperature detector illustrated in FIG. 1. At that time, the ink solution containing the first ink had been cooled to −5° C. or less in advance and was used in a coloring state, and the ink solution containing the second ink had been heated to 15° C. or more in advance and used in a decoloring state. The temperature detector prepared in this example indicated a color derived from the first ink and the second ink at 2° C. or less due to that both the first ink and the second ink were put into a coloring state, whereas the temperature detector changed to approximately colorless at 8° C. or more due to that both the first ink and the second ink were put into a decoloring state. Furthermore, it was shown that tampering was impossible. Accordingly, it was confirmed that the temperature detector prepared in this Example had an anti-tampering function and was able to detect temperature increase and temperature decrease.

Example 6

In the composition of a first ink, 1 part by weight of RED500 manufactured by Yamada Chemical Co., Ltd. as a leuco dye, 1 part by weight of ethyl gallate manufactured by Tokyo Chemical Industry Co., Ltd. as a developer, and 100 parts by weight of a mixture of tridecane and tricaprin as a decoloring agent were used. On the other hand, in a second ink, 1 part by weight of CVL manufactured by Yamada Chemical Co., Ltd. as a leuco dye, 1 part by weight of octyl gallate manufactured by Tokyo Chemical Industry Co., Ltd. as a developer, and 100 parts by weight of tricaprin as a decoloring agent were used. The preparation and printing of the first ink and the second ink were conducted in similar manners to that in Example 1 except for the compositions, and the temperature detector was printed so as to form the temperature detector illustrated in FIG. 1. At that time, the ink solution containing the first ink had been cooled to 2° C. or less in advance and was used in a coloring state, and the ink solution containing the second ink had been heated to 31° C. or more in advance and used in a decoloring state. The temperature detector prepared in this example indicated a color derived from the first ink and the second ink at 5° C. or less due to that both the first ink and the second ink were put into a coloring state, whereas the temperature detector changed to approximately colorless at 15° C. or more due to that both the first ink and the second ink were put into a decoloring state. Furthermore, it was shown that tampering was impossible. Accordingly, it was confirmed that the temperature detector prepared in this Example had an anti-tampering function and was able to detect temperature increase and temperature decrease.

Comparative Example 1

In this comparative example, only one kind of ink was used, the preparation and printing of the ink were conducted in similar manners to that in Example 1, and the temperature detector was disposed as shown in FIG. 2 and formed of a single ink. For the composition of the ink, 1 part by weight of RED50 manufactured by Yamada Chemical Co., Ltd. as a leuco dye, 1 part by weight of octyl gallate manufactured by Tokyo Chemical Industry Co., Ltd. as a developer, and 100 parts by weight of trilaurin as a decoloring agent were used. During the printing, the ink was once cooled to 25° C. or less and used in a coloring state. It was shown in the temperature detector prepared in this Comparative Example that temperature increase was able to be detected at 44° C. or more since the ink was put into a decoloring state, whereas the temperature detector caused coloring of the original color when cooled to 25° C. or less, and thus the temperature detector was able to be tampered. Furthermore, temperature decrease cannot be detected in the ink that has caused coloring once before printing. In addition, temperature increase cannot be detected in the ink that has caused decoloring before printing.

Comparative Example 2

The preparation and printing of the ink were conducted in similar manners to that in Comparative Example 1, and the temperature detector was disposed as shown in FIG. 1 and formed of a single ink. For the composition of the ink, 1 part by weight of RED500 manufactured by Yamada Chemical Co., Ltd. as a leuco dye, 1 part by weight of octyl gallate manufactured by Tokyo Chemical Industry Co., Ltd. as a developer, and 100 parts by weight of trilaurin as a decoloring agent were used. During the printing, the ink was once cooled to 25° C. or less and used in a coloring state. It was shown in the temperature detector prepared in this Comparative Example that temperature increase was able to be detected at 44° C. or more since the ink was put into a decoloring state, whereas the temperature detector caused coloring of the original color when cooled to 25° C. or less, and thus the temperature detector was able to be tampered. Furthermore, temperature decrease cannot be detected in the ink that has caused coloring once before printing. In addition, temperature increase cannot be detected in the ink that has caused decoloring before printing.

Comparative Example 3

In this comparative example, the preparation and printing of the ink were conducted in similar manners to that in Comparative Example 1, and the temperature detector was disposed as shown in FIG. 3 and formed of a single ink. For the composition of the ink, 1 part by weight of RED500 manufactured by Yamada Chemical Co., Ltd. as a leuco dye, 1 part by weight of octyl gallate manufactured by Tokyo Chemical Industry Co., Ltd. as a developer, 100 parts by weight of trilaurin as a decoloring agent were used. During the printing, the ink was once cooled to 25° C. or less and used in a coloring state. It was shown in the temperature detector prepared in this Comparative Example that temperature increase was able to be detected at 44° C. or more since the ink was put into a decoloring state, whereas the temperature detector caused coloring of the original color when cooled to 25° C. or less, and thus the temperature detector was able to be tampered. Furthermore, temperature decrease cannot be detected in the ink that has caused coloring once before printing. In addition, temperature increase cannot be detected in the ink that has caused decoloring before printing.

Comparative Example 4

The preparation and printing of the ink were conducted in similar manners to that in Comparative Example 1, and the temperature detector was disposed as shown in FIG. 4 and formed of a single ink. For the composition of the ink, 1 part by weight of RED500 manufactured by Yamada Chemical Co., Ltd. as a leuco dye, 1 part by weight of octyl gallate manufactured by Tokyo Chemical Industry Co., Ltd. as a developer, 100 parts by weight of trilaurin as a decoloring agent were used. During the printing, the ink was once cooled to 25° C. or less and used in a coloring state. It was shown in the temperature detector prepared in this Comparative Example that temperature increase was able to be detected at 44° C. or more since the ink was put into a decoloring state, whereas the temperature detector caused coloring of the original color when cooled to 25° C. or less, and thus the temperature detector was able to be tampered. Furthermore, temperature decrease cannot be detected in the ink that has caused coloring once before printing. In addition, temperature increase cannot be detected in the ink that has caused decoloring before printing.

Comparative Example 5

The preparation and printing of the ink were conducted in similar manners to that in Comparative Example 1, and the temperature detector was disposed as shown in FIG. 4 and formed of a single ink. For the composition of the ink, 1 part by weight of RED500 manufactured by Yamada Chemical Co., Ltd. as a leuco dye, 1 part by weight of octyl gallate manufactured by Tokyo Chemical Industry Co., Ltd. as a developer, and 100 parts by weight of tricaprin as a decoloring agent were used. During the printing, the ink was once cooled to 5° C. or less and used in a coloring state. It was shown in the temperature detector prepared in this Comparative Example that temperature increase was able to be detected at 31° C. or more since the ink was put into a decoloring state, whereas the temperature detector caused coloring of the original color when cooled to 2° C. or less, and thus the temperature detector was able to be tampered. Furthermore, temperature decrease cannot be detected in the ink that has caused coloring once before printing. In addition, temperature increase cannot be detected in the ink that has caused decoloring before printing.

Comparative Example 6

The preparation and printing of the ink were conducted in similar manners to that in Comparative Example 1, and the temperature detector was disposed as shown in FIG. 4 and formed of a single ink. For the composition of the ink, 1 part by weight of RED500 manufactured by Yamada Chemical Co., Ltd. as a leuco dye, 1 part by weight of octyl gallate manufactured by Tokyo Chemical Industry Co., Ltd. as a developer, and 100 parts by weight of a mixture of tridecane and tricaprin as a decoloring agent were used. During the printing, the ink was once cooled to 2° C. or less and used in a coloring state. It was shown in the temperature detector prepared in this Comparative Example that temperature increase was able to be detected at 15° C. or more since the ink was put into a decoloring state, whereas the temperature detector caused coloring of the original color when cooled to 2° C. or less, and thus the temperature detector was able to be tampered. Furthermore, temperature decrease cannot be detected in the ink that has caused coloring once before printing. In addition, temperature increase cannot be detected in the ink that has caused decoloring before printing.

Table 1 shows the decoloring temperatures and color developing temperatures of the first inks and second inks used in Examples 1 to 6 and Comparative Examples 1 to 6.

TABLE 1

|  | First Ink | | Second Ink | | Lower Limit Value of Detection Temperature (° C.) | Upper Limit Value of Detection Temperature (° C.) | Pattern of Detector |
| --- | --- | --- | --- | --- | --- | --- | --- |
|  | $T_{d1}$ (° C.) | $T_{a1}$ (° C.) | $T_{d2}$ (° C.) | $T_{a2}$ (° C.) | | | |
| Example 1 | 5 | 31 | 25 | 44 | 25 | 31 | FIG. 2 |
| Example 2 | 5 | 31 | 25 | 44 | 25 | 31 | FIG. 1 |
| Example 3 | 5 | 31 | 25 | 44 | 25 | 31 | FIG. 3 |
| Example 4 | 5 | 31 | 25 | 44 | 25 | 31 | FIG. 4 |
| Example 5 | −5 | 8 | 2 | 15 | 2 | 8 | FIG. 1 |
| Example 6 | 2 | 15 | 5 | 31 | 5 | 15 | FIG. 1 |
| Comparative Example 1 | 25 | 44 | — | | 25 | 44 | FIG. 2 |
| Comparative Example 2 | 25 | 44 | — | | 25 | 44 | FIG. 1 |
| Comparative Example 3 | 25 | 44 | — | | 25 | 44 | FIG. 3 |
| Comparative Example 4 | 25 | 44 | — | | 25 | 44 | FIG. 4 |
| Comparative Example 5 | 5 | 31 | — | | 5 | 31 | FIG. 1 |
| Comparative Example 6 | 2 | 15 | — | | 2 | 15 | FIG. 1 |

From Examples 1 to 6, it becomes possible to irreversibly detect temperature increase and temperature decrease by color change, by utilizing a temperature region where a first ink and a second ink respectively having color developing and decoloring temperatures are overlapped. Furthermore, since the temperature detector of the present invention is constituted by inks, it can be inexpensively printed on various substrates.

REFERENCE SIGNS LIST

110, 120, 130, 140, 150 temperature detector in initial state
111, 121, 141, 151 temperature detector after detection of temperature decrease detection
112, 122, 142, 152 temperature detector after temperature increase
123 temperature increase detection part formed of first ink (coloring state)
124 temperature decrease detection part formed of second ink (decoloring state)
125 temperature decrease detection part formed of second ink after detection of temperature decrease (coloring state)
126 temperature increase detection part formed of first ink after detection of temperature increase (decoloring state)
131 temperature increase detection part formed of first ink (coloring state)
132 temperature detector formed of first and second ink
133 temperature decrease detection part formed of second ink (decoloring state)
134 temperature detector formed of first and second ink after detection of temperature decrease
135 temperature decrease detection part formed of second ink after detection of temperature decrease (coloring state)

136 temperature increase detection part formed of first ink after detection of temperature increase (decoloring state)
137 temperature detector formed of first and second ink after detection of temperature increase
210, 230, 250 temperature detector after heating to $T_{a2}$ or more
220, 240, 260 temperature detector after cooling to $T_{d1}$ or less
231 temperature increase detection part formed of first ink after heating to $T_{a2}$ or more (decoloring state)
232 temperature decrease detection part formed of second ink after heating to $T_{a2}$ or more (decoloring state)
241 temperature increase detection part formed of first ink after cooling to $T_{a1}$ or less (coloring state)
242 temperature decrease detection part formed of second ink after cooling to $T_{d1}$ or less (coloring state)
251 temperature increase detection part formed of first ink after heating to $T_{a2}$ or more (decoloring state)
252 temperature detector formed of first and second ink after heating to $T_{a2}$ or more
253 temperature decrease detection part formed of second ink after heating to $T_{a2}$ or more (decoloring state)
261 temperature increase detection part formed of first ink after cooling to $T_{d1}$ or less (coloring state)
262 temperature detector formed of first and second ink after cooling to $T_{d1}$ or less
263 temperature decrease detection part formed of second ink after cooling to $T_{a1}$ or less (coloring state)
270 temperature detector formed of first, second and third inks after heating to $T_{a2}$ or more
280 temperature detector formed of first, second and third inks after cooling to $T_{d1}$ or less
290 temperature detector formed of first, second and third inks after heating to $T_{a2}$ or more
300 temperature detector formed of first, second and third inks after cooling to $T_{d1}$ or less
601, 602 temperature detector

The invention claimed is:

1. A temperature detector comprising:
a first ink in which a decoloring initiating temperature $T_{a1}$ during temperature increase and a color developing initiating temperature $T_{d1}$ during temperature decrease are different, and
a second ink in which a decoloring initiating temperature $T_{a2}$ during temperature increase and a color developing initiating temperature $T_{d2}$ during temperature decrease are different,
wherein the first ink and the second ink have overlapping temperature ranges,
wherein the decoloring initiating temperature $T_{a1}$, the color developing initiating temperature $T_{d1}$, the decoloring initiating temperature $T_{a2}$ and the color developing initiating temperature $T_{d2}$ have the relationship of $T_{d1}<T_{d2}<T_{a1}<T_{a2}$, and
wherein each the first ink and the second ink each contains at least a leuco dye, a developer and a decoloring agent, and the leuco dye, the developer, and the decoloring agent are each encapsulated by a resin coating.

2. The temperature detector according to claim 1, wherein when an initial temperature to be detected is set as T, the decoloring initiating temperature $T_{a1}$ and the color developing initiating temperature $T_{d2}$ satisfy the relationship of $T_{a1}>T>T_{d2}$.

3. The temperature detector according to claim 1, wherein the decoloring initiating temperature $T_{a1}$ and the color developing initiating temperature $T_{d2}$ satisfy the relationship of $5 \leq T_{a1}-T_{d2} \leq 15$.

4. The temperature detector according to claim 1, wherein in the initial state, the first ink causes coloring and the second ink causes decoloring,
the first ink causes decoloring at the temperature $T_{a1}$ or more, and
the second ink causes coloring at the temperature $T_{d2}$ or less.

5. The temperature detector according to claim 1, wherein the developer is 0.1 to 100 parts per weight with respect to 1 part per weight of the leuco dye.

6. The temperature detector according to claim 5, wherein the leuco dye in the first ink is 9-(N-ethyl-N-isopentylamino)spiro[benzo[a]xanthene-12,3'-phthalide].

7. The temperature detector according to claim 5, wherein the leuco dye in the second ink is 3-(4-diethylamino-2-methylphenyl)-3-(1-ethyl-2-methylindol-3-yl)-4-azaphthalide.

8. The temperature detector according to claim 5, wherein each the first ink and the second ink include 2,2'-azobis(isobutyronitrile) as a polymerization initiator, styrene, and 2-ethylhexyl acrylate as a composition for a resin coating.

9. The temperature detector according to claim 1, wherein the first ink and the second ink are each encapsulated by the resin coating.

10. The temperature detector according to claim 1, comprising a third ink in which a temperature $T_{a3}$ for initiating decoloring when the temperature increases and a temperature $T_{d3}$ for initiating color developing when the temperature decreases are different,
wherein the temperature detector has a relationship of $T_{d1}<T_{d2}<T_{d3}<T_{a1}<T_{a2}<T_{a3}$.

11. The temperature detector according to claim 1, comprising a third ink having a color that is unchanged against a temperature.

12. The temperature detector according to claim 11, wherein
in the initial state, the first ink and the third ink are in a coloring state, and the second ink cause a decoloring state,
the first ink causes decoloring at the temperature $T_{a1}$ or more, and
the second ink causes coloring at the temperature $T_{d2}$ or less.

13. The temperature detector according to claim 1, wherein
the temperature detector comprises a substrate on which the first ink has been printed, and
the second ink has been printed on the substrate so as to overlap with a part of the first ink.

14. The temperature detector according to claim 1, wherein
the temperature detector comprises a substrate on which the second ink has been printed, and
the first ink has been printed on the substrate so as to overlap with a part of the second ink.

15. The temperature detector according to claim 1, wherein
the temperature detector comprises a substrate on which the first ink and the second ink have been printed, and
the first ink and the second ink are disposed at a distance within 10% of the size of the printing of the first ink from each other.

16. The temperature detector according to claim 1, wherein
the first ink and the second ink each contains an electrically conductive agent.

17. The temperature detector according to claim 1, wherein the first ink and the second ink each further contains a polydimethylsiloxane chain.

\* \* \* \* \*